(12) United States Patent
Al-Yousef et al.

(10) Patent No.: US 11,288,378 B2
(45) Date of Patent: Mar. 29, 2022

(54) EMBEDDED DATA PROTECTION AND FORENSICS FOR PHYSICALLY UNSECURE REMOTE TERMINAL UNIT (RTU)

(71) Applicant: Saudi Arabian Oil Company, Dhahran (SA)

(72) Inventors: Hassan S. Al-Yousef, Qatif (SA); Fouad M. Alkhabbaz, Qatif (SA); Zakarya A. Abu Al Saud, Saihat (SA); Soloman M. Almadi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 371 days.

(21) Appl. No.: 16/280,687

(22) Filed: Feb. 20, 2019

(65) Prior Publication Data

US 2020/0265146 A1    Aug. 20, 2020

(51) Int. Cl.
*G06F 21/60* (2013.01)
*G06F 11/14* (2006.01)
*G06F 21/78* (2013.01)

(52) U.S. Cl.
CPC .......... *G06F 21/60* (2013.01); *G06F 11/1471* (2013.01); *G06F 11/1492* (2013.01);
(Continued)

(58) Field of Classification Search
CPC ...... G06F 21/60; G06F 21/78; G06F 11/1471; G06F 11/1492; G06F 2221/2101; G06F 2221/2143
See application file for complete search history.

(56) References Cited

U.S. PATENT DOCUMENTS

| 6,163,257 A | 12/2000 | Tracy |
| 7,644,290 B2 | 1/2010 | Ransom et al. |

(Continued)

FOREIGN PATENT DOCUMENTS

| CN | 102280929 | 12/2011 |
| CN | 103178520 | 6/2013 |
| WO | 2018207123 | 11/2018 |

OTHER PUBLICATIONS

European Communication Pursuant to Article 94 (3) EPC issued in European Application No. 18725052.7 dated Oct. 22, 2020, 7 pages.
(Continued)

*Primary Examiner* — Hee K Song
(74) *Attorney, Agent, or Firm* — Fish & Richardson P.C.

(57) ABSTRACT

Systems and methods include a method for protecting data for a remote terminal unit (RTU) and providing audit trail information for forensics procedures. Monitoring is performed for conditions detected at an RTU that warrant a data protection operation at the RTU. The monitoring is performed by an instrumented security function (ISF) chip communicating with the RTU in a supervisory control and data acquisition system (SCADA) network. Upon determining that conditions are warranted, the data protection operation is initiated by the ISF chip. The system also provides audit trail information for forensics procedures upon detecting a threat in the vicinity of the RTU. The system invokes the forensics procedure by initiating the localization services (HBL) embedded as part of the RTU's disk apparatus triggered by a change to the disk apparatus such as a power disconnect or by receiving a security signal from the NAC or local occupancy sensors.

17 Claims, 12 Drawing Sheets

(52) U.S. Cl.
CPC ...... *G06F 21/78* (2013.01); *G06F 2221/2101* (2013.01); *G06F 2221/2143* (2013.01)

(56) References Cited

U.S. PATENT DOCUMENTS

| | | | |
|---|---|---|---|
| 7,739,359 | B1 | 6/2010 | Millet et al. |
| 7,940,302 | B2 | 5/2011 | Mehrotra et al. |
| 8,102,238 | B2 | 1/2012 | Golander et al. |
| 8,312,320 | B2 | 11/2012 | Almadi |
| 8,334,775 | B2 | 12/2012 | Tapp et al. |
| 8,365,250 | B2 | 1/2013 | Denny |
| 8,543,716 | B1 | 9/2013 | Rashidi |
| 8,750,513 | B2 | 6/2014 | Renkis |
| 9,208,676 | B2 | 12/2015 | Fadell et al. |
| 10,250,619 | B1* | 4/2019 | Park ........................ H04L 63/18 |
| 10,897,398 | B2 | 1/2021 | Al-Yousef et al. |
| 2004/0188710 | A1 | 9/2004 | Koren et al. |
| 2005/0005093 | A1 | 1/2005 | Bartels et al. |
| 2005/0184084 | A1 | 8/2005 | Wells |
| 2006/0107061 | A1 | 5/2006 | Holovacs |
| 2007/0126576 | A1 | 6/2007 | Script et al. |
| 2007/0193834 | A1 | 8/2007 | Pai |
| 2008/0109883 | A1 | 5/2008 | Hernoud et al. |
| 2008/0109889 | A1 | 5/2008 | Bartels et al. |
| 2008/0228908 | A1 | 9/2008 | Link |
| 2009/0141896 | A1 | 6/2009 | McCown |
| 2010/0058052 | A1 | 3/2010 | Bartels et al. |
| 2010/0097205 | A1 | 4/2010 | Script |
| 2012/0060030 | A1 | 3/2012 | Lamb |
| 2012/0063354 | A1 | 3/2012 | Vanga et al. |
| 2012/0162423 | A1 | 6/2012 | Xiao |
| 2012/0307051 | A1 | 12/2012 | Welter |
| 2013/0151849 | A1 | 6/2013 | Graham et al. |
| 2013/0232338 | A1 | 9/2013 | Byres et al. |
| 2013/0247117 | A1 | 9/2013 | Yamada |
| 2014/0019768 | A1 | 1/2014 | Pineau et al. |
| 2014/0089671 | A1 | 3/2014 | Logue |
| 2014/0139681 | A1 | 5/2014 | Jones, Jr. et al. |
| 2014/0165182 | A1 | 6/2014 | Curry et al. |
| 2014/0230057 | A1 | 8/2014 | Berger |
| 2014/0254799 | A1 | 9/2014 | Husted |
| 2014/0280953 | A1 | 9/2014 | Brzozowski et al. |
| 2014/0298399 | A1* | 10/2014 | Heo ................... H04L 63/1416 726/1 |
| 2015/0205966 | A1 | 7/2015 | Chowdhury |
| 2015/0304346 | A1* | 10/2015 | Kim ........................ H04L 43/04 726/23 |
| 2016/0006745 | A1 | 1/2016 | Furuichi |
| 2016/0094578 | A1* | 3/2016 | McQuillan .......... H04L 63/1416 726/23 |
| 2016/0379211 | A1 | 12/2016 | Hoyos |
| 2017/0302691 | A1* | 10/2017 | Singh .................. H04L 63/1408 |
| 2017/0329783 | A1* | 11/2017 | Singh ................ G06F 16/24578 |
| 2017/0353491 | A1 | 12/2017 | Gukal |
| 2017/0356780 | A1 | 12/2017 | Smith et al. |
| 2018/0092331 | A1 | 4/2018 | Zuidhof |
| 2020/0125470 | A1* | 4/2020 | Cui .................... G05B 23/0267 |
| 2020/0202008 | A1* | 6/2020 | Pfleger de Aguiar ..................... G06F 11/3041 |

OTHER PUBLICATIONS

International Search Report and Written Opinion issued in International Application No. PCT/US2018/028055 dated Jun. 27, 2018, 14 pages.
PCT International Search Report and Written Opinion issued in International Application No. PCT/US2020/015917 dated May 13, 2020, 14 pages.
International Search Report and Written Opinion issued in International Application No. PCT/US2020/019009 dated May 8, 2020, 14 pages.
CN Office Action in Chinese Appln. No. 201880039751.0, dated Sep. 3, 2021, 12 pages, with English Translation.
GCC Examination Report in GCC Appln. No. GC 2020-39209, dated Jul. 15, 2021, 3 pages.
GCC Examination Report in GCC Appln. No. GC 2020-39098, dated May 27, 2021, 3 pages.

* cited by examiner

EMBEDDED DATA PROTECTION AND FORENSICS FOR PHYSICALLY UNSECURE REMOTE TERMINAL UNIT (RTU)

BACKGROUND

The present disclosure applies to protecting data in supervisory control and data acquisition system (SCADA) networks and provide audit trail information for forensics procedures. A SCADA includes automation software written specifically to perform data acquisition requirements for an individual plant. The software can control commands and data transfer between Master Stations (MS) (including servers and software responsible for communicating with field equipment), human machine interfaces (HMIs) workstations, and field devices connected to remote terminal units (RTUs). Field devices can include, for example, pressure transmitters, flow meters, and temperature sensors. SCADA networks that include RTUs can present challenges regarding data protection.

SUMMARY

The present disclosure describes techniques that can be used for providing embedded data protection and forensics for a physically unsecure remote terminal unit (RTU). In some implementations, methods include a computer-implemented method for protecting data for a Remote Terminal Unit (RTU) in addition to providing audit trail information for forensics procedures. Monitoring is performed for conditions detected at an RTU that warrant a data protection operation and forensics procedures at the RTU. The monitoring is performed by an instrumented security function (ISF) chip communicating with the RTU in a supervisory control and data acquisition system (SCADA) network. Upon determining that the conditions detected at the RTU warrant the data protection operation and the forensics procedures, the data protection operation and forensics procedures are initiated by the ISF chip.

The present disclosure relates to providing embedded data protection and forensics capabilities for RTUs in SCADA systems. More particularly, the present disclosure relates to a system and a method for protecting an RTU's buffering information, configuration data, and associated personnel identification and authentication information. Additionally, a system to facilitate audit trails is also provided for forensics procedures by way of localization services embedded as part of the RTU's disk apparatus. As an example, a chip as described with reference to FIG. 9 can be incorporated into an RTU and can provide the embedded data protection and forensics capabilities. Techniques described in the present disclosure can be part of SCADA systems, for example, for upstream oil and gas applications, pipeline applications, and power and utility applications that may not be protected by adequate physical security controls.

Distributed Control Systems (DCSs) are designed to perform regulatory control algorithms and processes to keep processes within set-points in a specific area, or risk area, of the plant. A DCS can provide supervisory control, including performing event-based monitoring algorithms that perform data-gathering over a large geographical area. Unlike DCSs, SCADAs can provide telemetry-based process control commands initiated from the Central Master Station ("master station"). Commands can be provided either manually by an operator or automatically using an application. Each command can initiate an action or change an analog set point in a remotely-located control station, for example, using an RTU. Commands can be provided over a bidirectional communications link using specific communication protocols. Commands can depend on quality process-related alarm or event data and can follow timely bidirectional confirmation and acknowledgment executing sequences (for example, check before operate (CBO)) between a master and the station.

Each master station can include multiple servers, distributed software applications, and disaster recovery sites. Master stations can include network switch and connectivity devices that are required to communicate with RTUs and remote sites. Communications can use bidirectional information transfer (in both directions) between master stations and remote terminals within a communication channel. As part of SCADA operations, commands can be sent by operators or by applications in binary or analog formats. The commands can be sent from a human machine interface (HMI) station to field instruments connected to a particular RTU to provide a status reading or to perform a certain action remotely. The command originating from the HMI station can typically be delivered to its target as quickly as possible, such as within seconds or sub-seconds. If a command cannot be delivered or acted upon, the SCADA system can report that failure to the operator.

Master stations, HMIs, and remote terminal units (RTUs) can use a communication medium that facilitates signaling between these terminals, such as by using a path between a master station, HMIs, RTUs, and programmable logic controllers (PLCs). The communication medium can be part of an overall communications subsystem that performs the transmitting and receiving of digital information for the entire SCADA. The communication medium can use media such as fiber optics, copper cabling, wireless, and very small aperture terminal (VSAT) communications.

In some instances, the remote RTU can be configured with a system buffer capable of storing field information for a configurable period of time (for example, seven days) in the course of transmission from one point to another. The buffer can be used to compensate for a difference in the flow of data, or a time of occurrence of events, when transmitting data from one device to another. If a flow of data is compromised, the data may be used maliciously to determine a type of the facility (for example, an oil, gas, or water well). Additionally, the compromised data may be used to generate trends or patterns, which can expose intelligent and sensitive information as to a well's ascending or descending production capacity. Further, the frequency between data transmissions can indicate an "importance" of the facility to an organization.

Another important type data to protect at an RTU location is the RTU's own configuration file. If compromised, the configuration parameters specified in the configuration file can be used to set up (or spoof) a rogue RTU that can simulate inputs from the field so as to act as a real RTU. The RTU's configuration file may typically be stored in an unprotected part of the RTU's controller board, easily accessible by any hand-held computer.

Another important type of data to protect at the RTU location is the data pertaining to the physical occupancy and authentication processes. The data can include inputs from motion detection, radio frequency identification (RFID), and personal identification number (PIN) input devices that capture personnel movements and personal identification information within a vicinity of the RTU. A remote data protection function that combines these types of data protection can be imperative for assuring field data integrity and availability.

The system is also capable of providing audit trail information for forensics procedures once a threat is detected in the vicinity of the RTU. The system invokes the forensics procedure by initiating the localization services embedded as part of the RTU's disk apparatus upon the detection of any change to the disk apparatus such as a power disconnect or by receiving a security signal from the NAC or local occupancy sensors.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method/ the instructions stored on the non-transitory, computer-readable medium.

The subject matter described in this specification can be implemented in particular implementations, so as to realize one or more of the following advantages. First, techniques can be used to secure SCADA network access to a remote RTU in a physically unprotected location, providing embedded RTU data protection and forensics capability. Second, the techniques can help to assure the security and integrity of the SCADA network, including data stored at the RTU in a physically unprotected location. Third, the techniques can be used to provide audit trails and evidence information for forensic procedures.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

Figure 1:
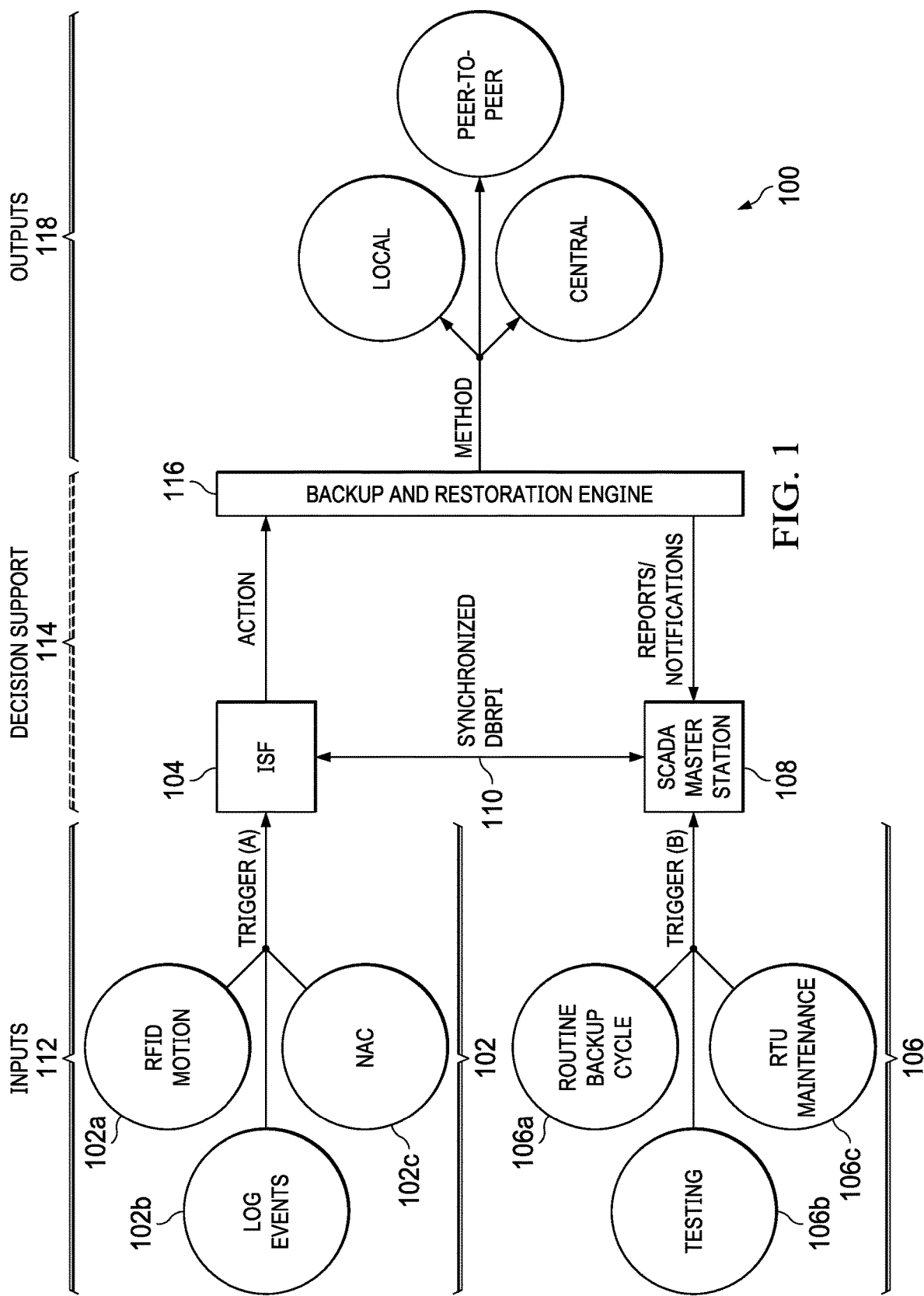
FIG. 1 is a block diagram showing an example of a replication process, according to some implementations of the present disclosure.

The following detailed description describes techniques for providing embedded data protection and forensics for a physically unsecure remote terminal unit (RTU). Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and in as much as such details are within the skill of one of ordinary skill in the art. The present disclosure is not intended to be limited to the described or illustrated implementations, but to be accorded the widest scope consistent with the described principles and features.

The techniques described in the present disclosure can be used to provide embedded RTU data protection and forensics capability within a Supervisory Control and Data Acquisition (SCADA) network. For example, a system that provides integrated security as part of an RTU in the SCADA network can include Internet protocol (IP) video servers and recorders, motion detectors, occupancy sensors, radio frequency identification (RFID) and personal identification number (PIN) identification, a network access controller (NAC), and a network management system (NMS). The system can support the receipt and use of security parameters that are input from the field. The motion detection and occupancy sensing instrumentation can be connected to the RTU in addition to the IP video camera with infra-red (IR) night vision capabilities, RFID identification, and PIN identification.

In some implementations, a system can provide remote RTU data protection and forensics capabilities and automated configuration assignment processes. The system can include a custom hard disk apparatus in communication with a central SCADA network and an RTU motherboard (for example, for power and data). The custom hard disk apparatus can include a memory, a processor, a relay, an uninterruptable power supply (UPS), a homing beacon, and a global positioning system (GPS) receiver coupled to an instrumented security function (ISF). The ISF can be implemented, for example, as an ISF chip onboard (and executable by) the RTU. The ISF chip can communicate with multiple inputs from within the RTU and from the SCADA network. The ISF chip can also communicate concurrently with at least one data storage within the custom hard disk apparatus and an off-RTU location. For example, the off-RTU location can be on another RTU or in a central location on the SCADA network. The ISF chip can evaluate inputs received from the NAC apparatus. When the NAC apparatus detects suspicious events, the ISF can trigger a self-destruct routine to erase critical data in RTU storage. Additionally, a homing beacon and localization services can be initiated by the ISF upon detection of negative authentication or a power interruption (for example, detected by the UPS). The system invokes the forensics procedure by initiating the localization services (homing beacon) embedded as part of the RTU's disk apparatus upon the detection of any change to the disk apparatus such as a power disconnect or by receiving a security signal from the NAC or local occupancy sensors. The homing beacon and localization parameters (position coordinates) are transmitted wirelessly to a Fly-By unmanned aerial vehicle (UAV), Global System for Mobile (GSM) network, or standard wireless backhaul connection.
Data Protection and Forensics To ensure full restoration of the RTU data after an erase procedure, the data at the RTU can be periodically replicated locally onto an encrypted data storage or onto an encrypted data storage in another RTU in the field. The replication and restore procedure can include the RTU node communication configuration such as a transmission control protocol/Internet protocol (TCP/IP) address stored on erasable programmable read-only memory (EPROM), as once this is lost or damaged, the communication capability with the rest of the network is lost.

In another implementation, a "Restore" process can be used to restore all information back to a wiped disk but not to a wiped EPROM. An RTU with a damaged or wiped EPROM can require either a manual configuration using recommend standard (RS)-232 serial communication connected by laptop or by devising a new automatic method. Though the backup process covers the RTU configuration file which contains the RTU name and address fields, the configuration file in the description resides on the disk rather than on the EPROM but copies other RTU parameters residing elsewhere, such as the EPROM.

In another implementation, the replication process can be performed using a full disk encryption feature (for example, Bitlocker). Replication can serve the purpose of preserving the data, for example, for disaster recovery procedures.

FIG. 1 is a block diagram showing an example of a replication process 100, according to some implementations of the present disclosure. For example, FIG. 1 shows interactions between triggers, the ISF, and a SCADA Master Station in activating Backup and Restore processes. In some implementations, the replication process 100 (including Backup and Restore functions) is based on two-dimensional triggers, including triggers 102 initiating an ISF 104 and triggers 106 initiating a SCADA Master Station (MS) 108. The triggers 102 can include, for example, RFID events 102a, log events 102b, and NAC events 102c. The triggers 106 can include, for example, routine backup cycle events 106a, testing events 106b, and RTU maintenance events 106c.

The ISF 104 can serve as the ultimate controller for the replication process 100, including being the primary host of a synchronized Dynamic Backup & Restore Process Index (DBRPI) 110. The DBRPI 110 can use (or can include) a simple information array that maps RTU names and addresses to the Backup/Restore job information (for example, identifying scope, cycle and priority). The two-dimensional triggers can serve as inputs 112 to a decision support function 114 that includes a backup and restoration engine 116. The decision support function 114 can produce outputs 118.

Figure 2:
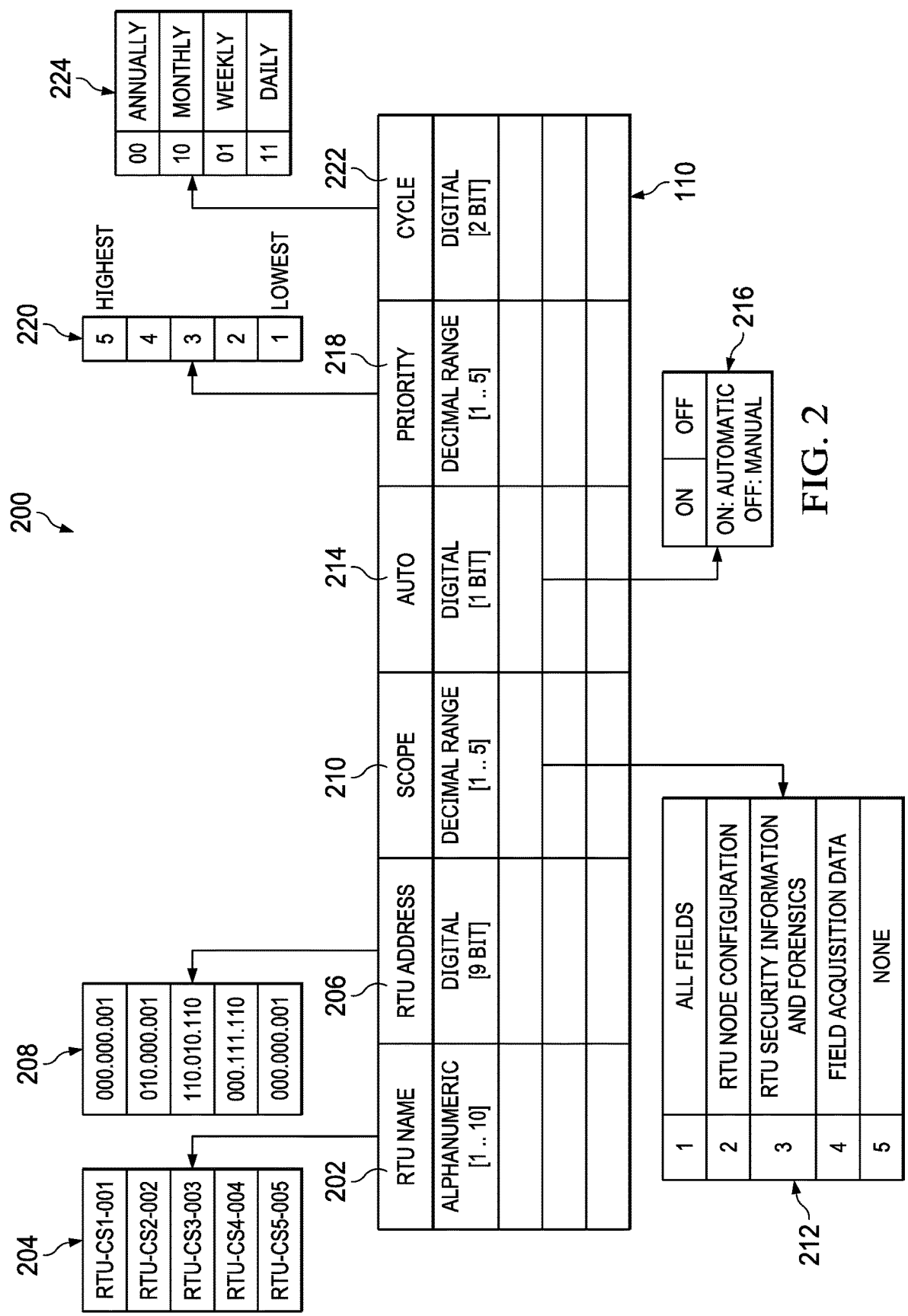
FIG. 2 is a block diagram showing an example of dynamic backup and restore process information, according to some implementations of the present disclosure.

FIG. 2 is a block diagram showing an example of dynamic backup and restore process information 200, according to some implementations of the present disclosure. The restore process information 200 can be implemented by the DBRPI 110, for example. The DBRPI 110 can be a table that includes fixed length fields. The fields can include, for example, an RTU name 202 consisting of ten alphanumeric characters, such as indicated by examples listed in RTU names 204. In addition, the DBRPI 110 can contain the following fields. An RTU physical address 206 (for example a nine-bit field) can have values as indicated by examples listed in RTU physical addresses 208. A scope entry 210 (for example, five decimal digits) can have values as indicated in example scopes 212. An "Auto" entry 214 (for example, one bit long) can be either ON or OFF, as indicated in example auto bits 216. A "Priority" indicator 218 (for example, five decimal digits) can have values as indicated in example priorities 220. A "Cycle" 222 (for example, two bits) can have values as indicated in example cycles 224.

In some instances, the ISF receives input from the Network Access Control (NAC) which might indicate a pending security requirement to perform a data replication process. Similarly, a trigger can be initiated from the SCADA Master Station (MS) indicating a system availability requirement in order to perform the data replication service.

In some implementations, the data replication triggers can be channeled through a soft switch at the operator's HMI station to enable an operator's intervention. The soft switch can be beneficial in events where triggers may be forced to engage or disengage (for example, used in troubleshooting).

In some implementations, the data replication employs three records of information: an RTU node configuration, RTU security information, and archived field instruments acquisition data. Each of the three fields can have its own run cycle and execution priority. In some instances, a SCADA administrator may elect to assign a higher priority to RTU configuration (for example, in remote sites where deploying a new RTU is cumbersome, but replacing a faulty hard drive is easier). In other cases, the RTU security information may be of higher importance (for example, in cases in which RTUs are installed in very unsecure areas).

In some implementations, the replication process can be conducted onto a locally attached media that is supported within the chassis of the RTU itself and is connected simultaneously to RTU power and a network. In some implementations, the management of the replication process can be centrally managed by the NAC apparatus or by each RTU as part of a distributed management process. In some implementations, the RTU's data can be periodically replicated onto an array of encrypted data storage allocated on the SCADA network. Examples of architectures that can support different implementations of replication are provided in FIGS. 4, 7 and 8.

In some implementations, a custom hard disk apparatus can include a custom Rapid Erase File System (REFS) that can be used to quickly erase information. This can be accomplished by having different types of information ranked by priorities that correspond to criticality levels of different types of information. The priorities can then be used to determine an order of erasure. For example, the RTU's configuration data can be ranked with a top priority, indicating a greatest criticality, causing the critically ranked data to be erased before lower priority data. An example of a custom hard disk apparatus that can house the REFS and can be used to quickly erase information is provided with reference to FIG. 4.

In some implementations, as power is cut off from an RTU, the ISF can enter into a race against time and power reserves to complete the mission of erasing data before the data is compromised. In order to provide mechanisms that support the mission, the REFS embodies a custom file system can be used for storing critical information in "adjacent" clusters so that the entire file can be destroyed at the hardware level.

In some implementations, the custom REFS file system can include intelligence for storing logical block addressing (LBA) of critical files, such as configuration files, encryption keys, authorization and authentication signals from RFID, motions detection, and personal identification number (PIN) apparatuses. For example, the configuration file can be "tagged" by the ISF to be stored in a particular cylinder, head, and track number that corresponds to a particular LBA of files. The REFS can assign a priority (for example, based on file criticality) that can be used to sequence the file deletion process. An example of LBA addressing for critical files within a disk layout is provided in FIG. 11.

Figure 3:
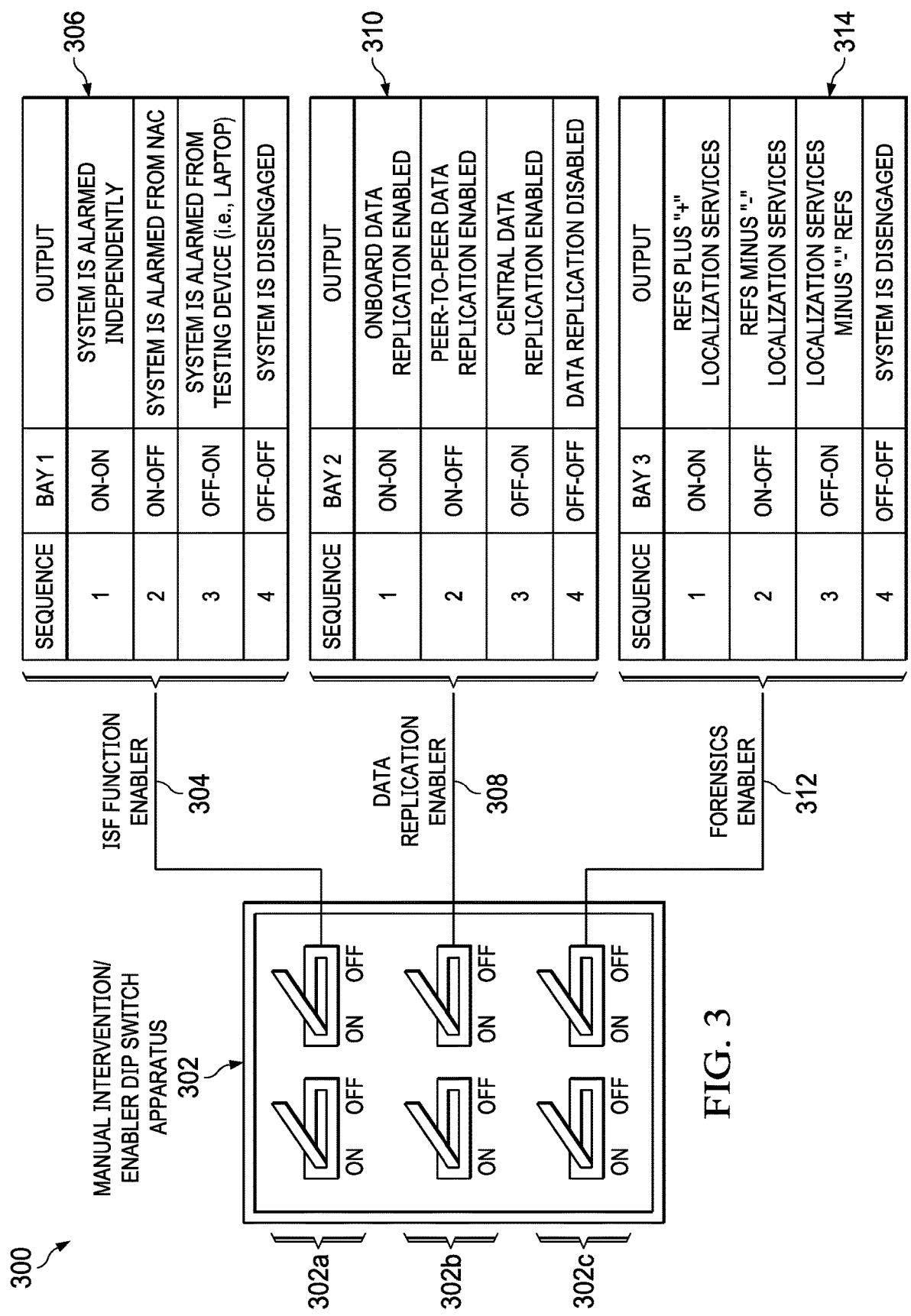
FIG. 3 is a block diagram showing an example of an enabling process, according to some implementations of the present disclosure.

FIG. 3 is a block diagram showing an example of an enabling process 300, according to some implementations of the present disclosure. In some implementations, the ISF, data replication, and forensics processes can be triggered by a manual dip switches arrangement 302 on the RTU. A dip switch apparatus that includes the manual dip switches arrangement 102 can be in communication with the ISF. The dip switch apparatus can contain three bays, with Bay 1 controlling the ISF, Bay 2 controlling data replication, and Bay 3 controlling forensics. For example, an ISF function enabler 304 using top two switches 302a of the manual dip switches arrangement 302 can control on-off settings for Bay 1, as summarized in table 306. A data replication enabler 308 using middle two switches 302b of the manual dip switches arrangement 302 can control on-off settings for Bay 2, as summarized in table 310. A forensics enabler 312 using bottom two switches 302c of the manual dip switches arrangement 302 can control on-off settings for Bay 3, as summarized in table 314. In some implementations, the dipswitch apparatus can be used in testing and simulation scenarios and in situations where communication with NAC apparatus is not stable or is intermittent.

In some implementations, the REFS can store the critical information in a particular location, such as within center tracks of the RTU disk. Storage of the critical information in the particular location can help to minimize the time taken for the head movement to erase targeted data, thus preserving the auxiliary battery. The time can be minimized for center tracks because, on average, the disk read/write head has a higher probability of being closer to the center of the disk.

On-Demand RTU and Data Movement Tracking

In some implementations, the RTU can communicate with a homing beacon and localization (HBL) services apparatus. The HBL can be managed by the ISF chip using multi-parameter inputs from other instruments. The inputs can include, for example, an electrical relay that senses power feed supply continuation, identification of the UPS which invokes the data storage battery to power the disk apparatus, and other signals received from the NAC apparatus. Upon detection of a power supply disconnection coupled with movement of the RTU or data storage, the HBL can initiate a tracking process by broadcasting a homing beacon according to a time interval. The homing beacon can be a three-fielded signal containing, for example, a device identifier (ID), device GPS coordinates, and a timestamp. The fields can be acquired wirelessly, for example, using a fly-by drone or unmanned aerial vehicle (UAV). Before an HBL process is started, a self-destruct signal can be received from the NAC apparatus and processed accordingly.

In some implementations, a self-destruct process can be targeted for the entire data structure or can be directed to specific data portions that include, for example, RTU configuration data or accumulated authorization and authentication data (for example, associated with PIN, RFID, IP cameras, and occupancy-sensing devices). Self-destruct procedures can use sanitization software that targets data deletion at the block level, including deleting the mapping table and erasing all blocks that have been written to.

In some implementations, the RTU configuration and other information can be restored from local or remote encrypted storage. Upon normalization of events at the RTU premises, the NAC can initiate a data restoration process, including passing a decryption key to the ISF chip and sending a restoration completion notification to an HMI workstation.

In some implementations, a camera or a fingerprint scanner can be embedded as part of the RTU box. The camera and/or fingerprint scanner can be activated upon a detected movement and can capture facial images and fingerprints for biometric identification and forensic investigation. Additionally, the ISF chip can use a program that is activated, for example, when the RTU is connected to a computer hacker's computing device or to the network. The program can then establish a communication with the RTU owner's backbone system and can provide images, fingerprints and event tracking of what is being processed in the RTU.

Figure 4:
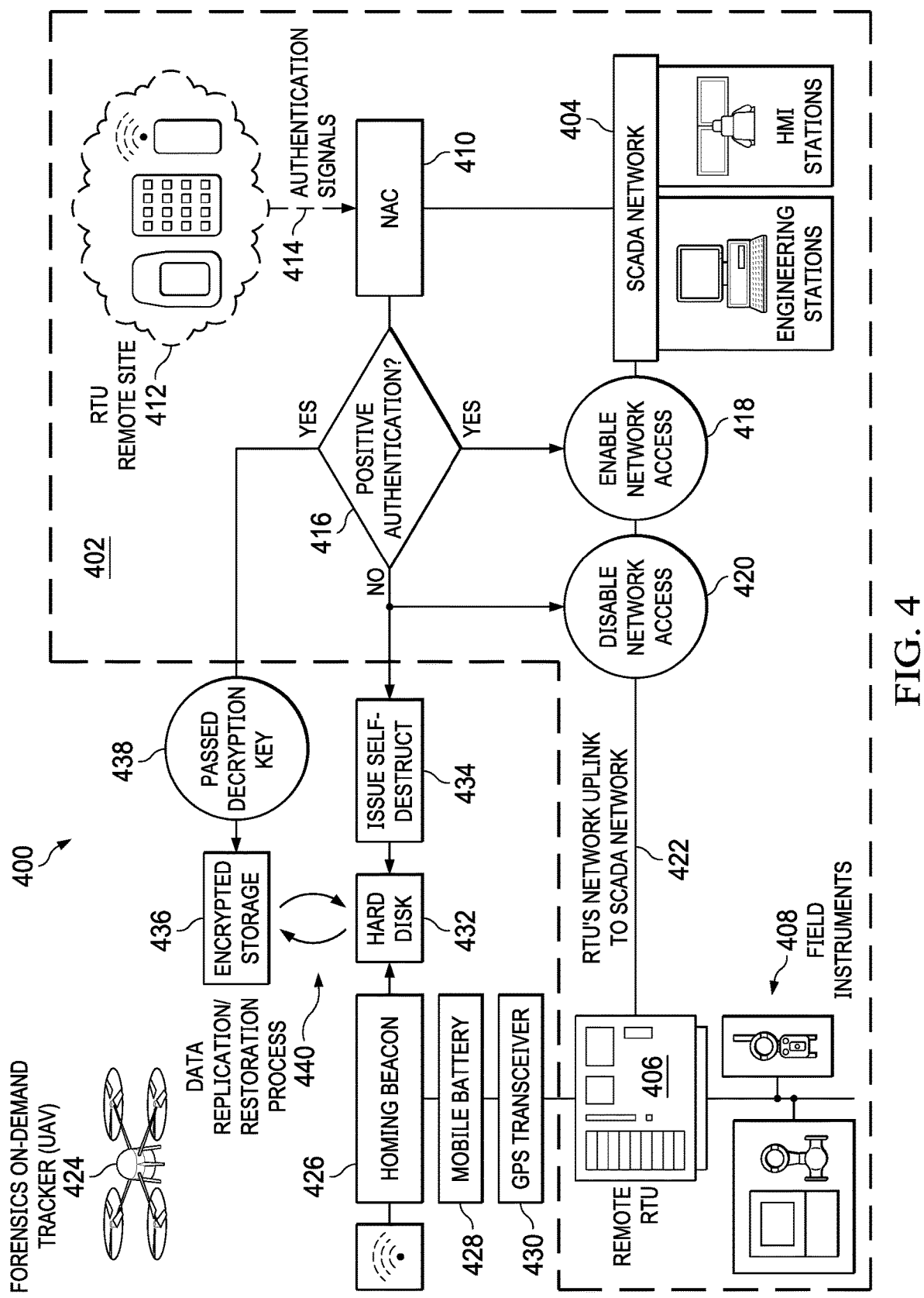
FIG. 4 is a block diagram of an example of a network security architecture, according to some implementations of the present disclosure.

FIG. 4 is a block diagram of an example of a network security architecture 400, according to some implementations of the present disclosure. For example, the network security architecture 400 can be used to periodically replicate data at an RTU onto an encrypted data storage system. Features of the network security architecture 400 that may be provided by some conventional systems are contained in dashed lines 402. Features of the network security architecture 400 that are not provided by conventional systems are contained in RTU data replication services that are included in techniques described in the present disclosure.

A SCADA network 404 connects a remote RTU 406, field instruments 408, a NAC 410, and an RTU remote site 412. The NAC 410 can receive authentication signals 414 from the RTU remote site 412. Positive authentication 416 can be performed, resulting in either enabling network access 418 or disabling network access 420. A network uplink 422 can serve as the RTU's network uplink to a SCADA network. In some implementations, conventional systems can provide the elements 404-422.

The network security architecture 400 further includes a forensics on-demand tracker 424 (for example, implemented using an unmanned aerial vehicle (UAV)) that can perform tracking using transmissions from a homing beacon 426 coupled with a mobile battery 428 and a GPS transceiver 430. A hard disk 432 can store data, including the RTU's configuration data. An issue self-destruct command 434 can erase information on the hard disk 432. Replication of data can occur using encrypted storage 436 for storing encrypted data. Decryption of the encrypted data can occur using a passed decryption key 438. Replication can be part of a data replication/restoration process 440.

In some implementations, the custom disk apparatus can be implemented centrally for the entire SCADA network, eliminating the need to install an individual intelligent disk apparatus for each RTU in the field. This can be particularly prudent in the presence of a reliable infrastructure, such as dark fiber optics or on top of Wave Division Multiplexing or Time Division Multiplexing transmission systems. The central disk apparatus can be composed of the same components as the de-centralized version but can be missing the homing beacon, the GPS receiver, or the wireless transmitter, as those components are installed on the field RTU to provide HBL services.

In some implementations, the central disk apparatus can provide centralization of two functions: 1) the RTU disk storage area, which is used to store RTU configuration, security information, forensics, and field acquisition data; and 2) the central disk apparatus, which centralizes power utilization curves for individual RTUs and the REFS files system rapid erase capabilities. In this scenario, the central disk apparatus can utilize virtual links on the SCADA remote site connectivity network to communicate with a virtual implementation of the disk apparatus in the field RTU. The virtual links can be used to constantly check for security information from either the NAC or local motion detectors. The virtual links can also be used to constantly check for main power interruptions as recorded by the central disk apparatus. As is the case for actions of the de-centralized disk apparatus, the centralized disk apparatus can trigger Rapid File Erase procedures and engage HBL services once cybersecurity threats are detected. A difference is that, for the centralized disk apparatus, the information destruction occurs on a specific area of the RTU's central disk apparatus.

Figure 5:
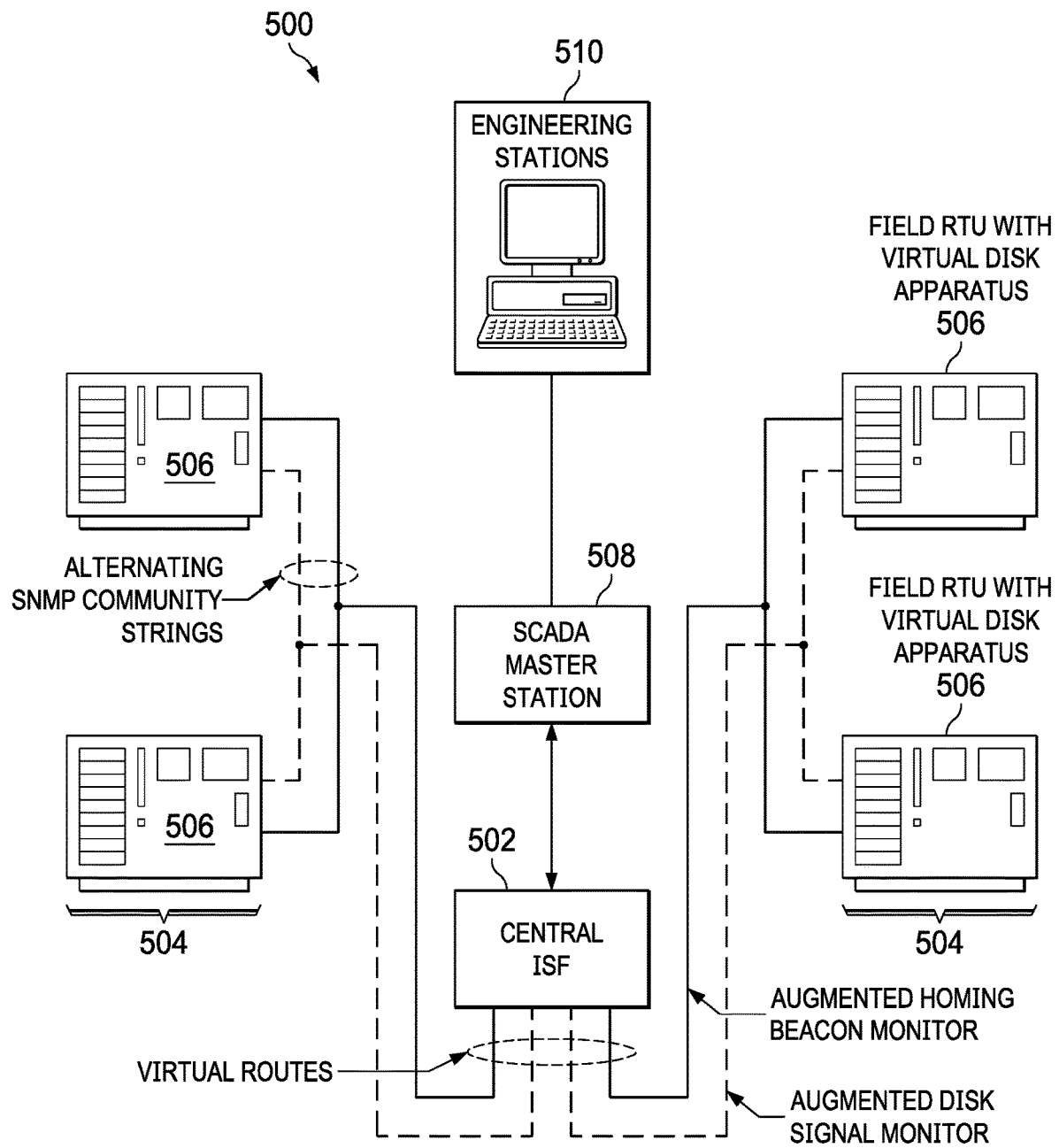
FIG. 5 is a block diagram showing an example of a centralized implementation that includes a central instrumented security function (ISF) and an intelligent disk apparatus, according to some implementations of the present disclosure.

FIG. 5 is a block diagram showing an example of a centralized implementation 500 that includes a central ISF 502 and an intelligent disk apparatus 504, according to some implementations of the present disclosure. The intelligent disk apparatus 504 can be implemented, for example, within field RTUs 506 with a virtual disk apparatus. The central ISF 502 can communicate with a SCADA master station 508. Engineering stations 510 can serve as the front end to the SCADA master station 508.

In some implementations, the centralized disk apparatus can communicate with the multiple field RTUs 506 using virtual routes on top of a TCP/IP standard communication stack. While Simple Network Management Protocol (SNMP) version 3 or, for example, Modbus/IP can be used for SCADA telemetry communication, the centralized disk apparatus can use a common and standard Poll/Push IP-based management communication protocol such as SNMP. Using SNMP, the centralized disk apparatus can "Push" commands to the virtual disk apparatus to request, for example, uptime status, power supply fluctuations curves, or abnormal activities within the RTU's vicinity.

Figure 6:
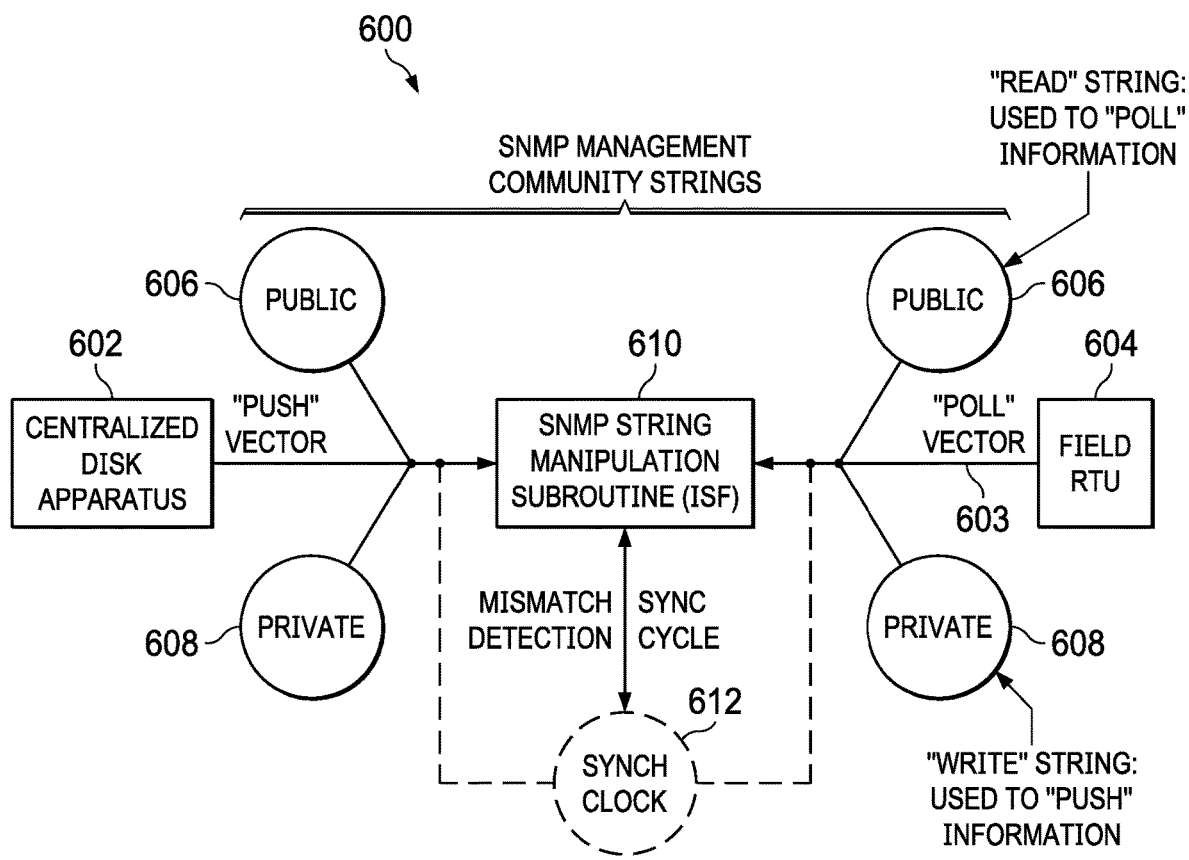
FIG. 6 is a block diagram showing an example of an implementation using alternating Simple Network Management Protocol (SNMP) strings, according to some implementations of the present disclosure.

FIG. 6 is a block diagram showing an example of an implementation 600 using alternating SNMP strings, according to some implementations of the present disclosure. In some implementations, using the implementation 600 for example, a centralized disk apparatus 602 can "Poll" (603) configuration, security, and field acquisition data and information from multiple field RTUs 604 on demand, as requested by the ISF function data analysis or SCADA NAC input. To optimize the security configuration of the SNMP stack on the remote RTU, public community strings 606 and private community strings 608 can be dynamically manipulated by the ISF so that a rogue RTU will never be accepted by the central disk apparatus, as one of both community strings will always be out of synchronization. As part of its function, the ISF can employ an SNMP string manipulation subroutine 610 to dynamically alternate both the public community strings 606 and private community strings 608 required for SNMP communication as per a configurable cycle and algorithm. Once the community strings on both the field RTU 604 and on the central disk apparatus 602 match, a broader communication channel can be used to exchange information between the node and the central controller. Otherwise, a recurrent mismatch can indicate foul play or a rogue (for example, fake) device being inserted into the SCADA network. A synch clock 612 can be used to keep the centralized disk apparatus 602 and the field RTUs 604 in synch.

Figure 7:
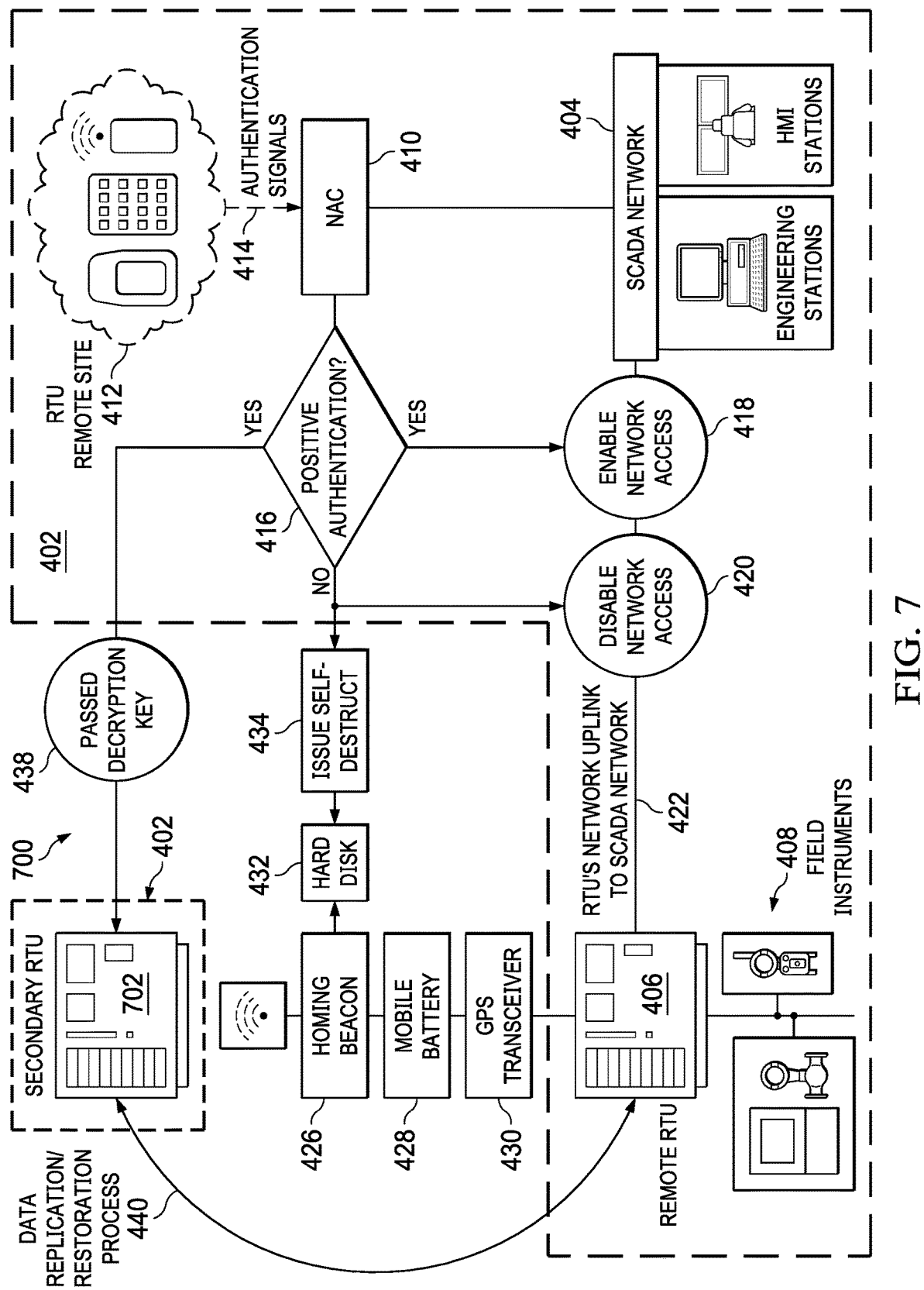
FIG. 7 is a block diagram of an example of a network security architecture using RTU-to-RTU (remote terminal unit) data replication services, according to some implementations of the present disclosure.

FIG. 7 is a block diagram of an example of a network security architecture 700 using RTU-to-RTU data replication services, according to some implementations of the present disclosure. For example, the network security architecture 700 can be used to periodically replicate data at an RTU onto an encrypted data storage in another RTU in the field. The network security architecture 700 is similar to the network security architecture 400 except for the addition of a secondary RTU 702. Features of the network security architecture 700 that may be provided by some conventional systems are contained in dashed lines 402. Features of the network security architecture 700 that are not provided by conventional systems include RTU-to-RTU data replication services. Replication and restoration procedures that are included in the data replication/restoration process 440 include replication to (and recovery from) the secondary RTU 702.

Figure 8:
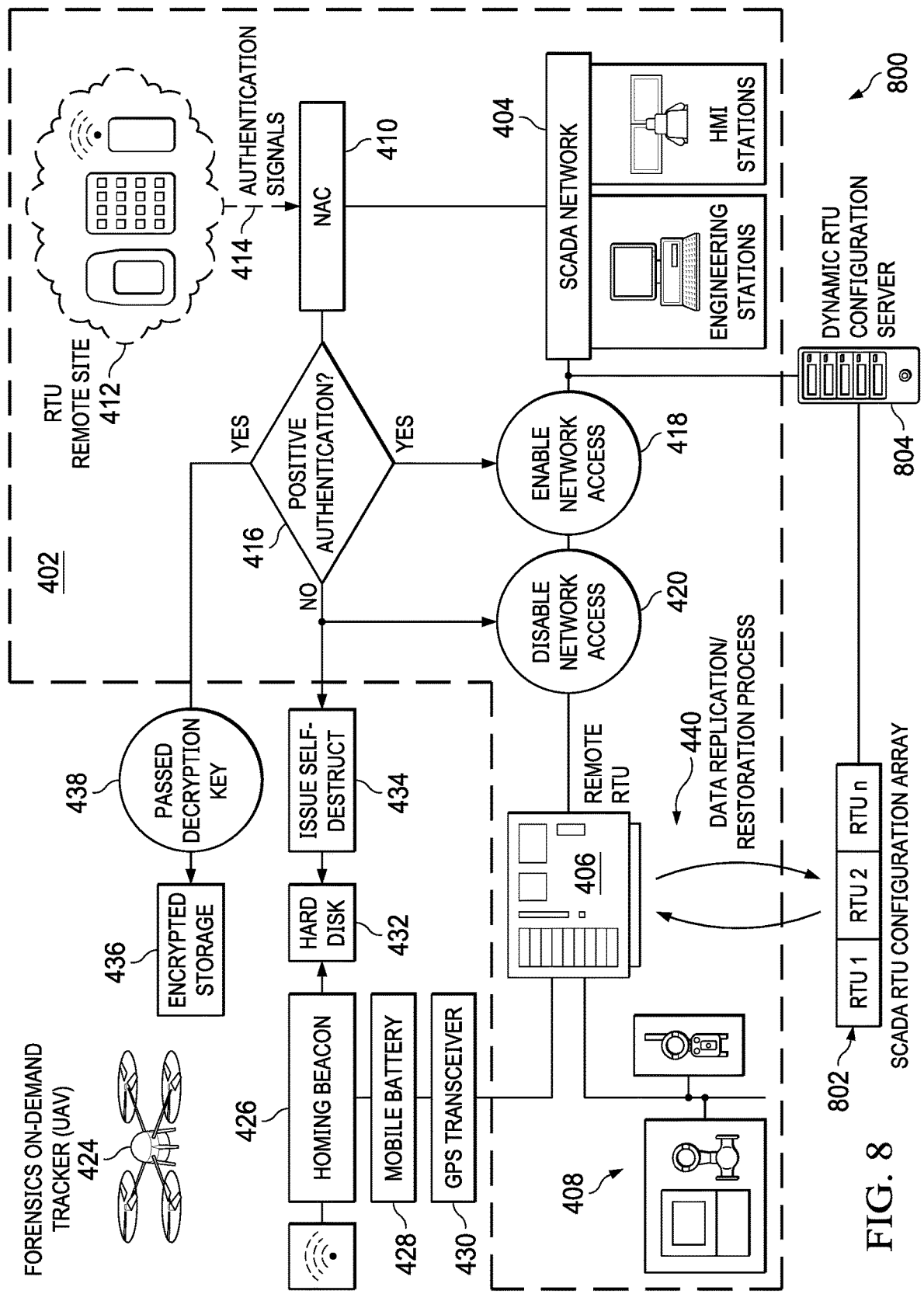
FIG. 8 is a block diagram of an example of a network security architecture including RTU-to-SCADA (supervisory control and data acquisition) network data replication services, according to some implementations of the present disclosure.

FIG. 8 is a block diagram of an example of a network security architecture 800 including RTU-to-SCADA network data replication services, according to some implementations of the present disclosure. For example, the network security architecture 800 can be used to periodically replicate data at an RTU onto an array of encrypted data storage allocated on the SCADA network. The network security architecture 800 is similar to the network security architecture 400 except for the addition of a SCADA RTU configuration array 802. Features of the network security architecture 800 that may be provided by some conventional systems are contained in dashed lines 402. Features of the network security architecture 800 that are not provided by conventional systems include RTU-to-SCADA network data replication services. Replication and restoration procedures that are included in the data replication/restoration process 440 include replication to (and recovery from) the SCADA RTU configuration array 802. An RTU configuration server 804 (attached to the SCADA network 404) can be used to complete the data replication/restoration process 440.

Figure 9:
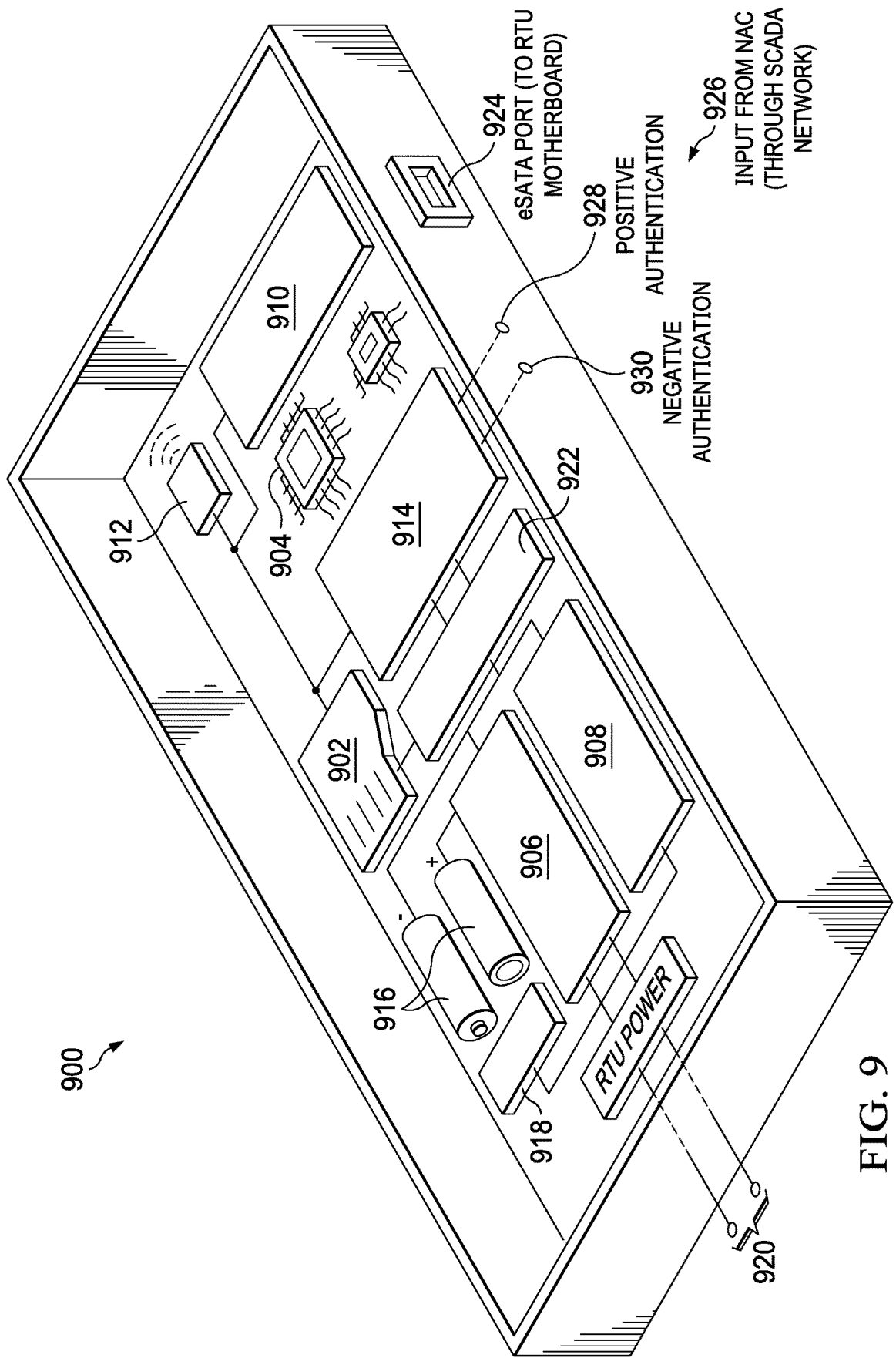
FIG. 9 is a diagram of an example of a custom hard disk apparatus in communication with the RTU motherboard and the central SCADA network, according to some implementations of the present disclosure.

FIG. 9 is a diagram of an example of a custom hard disk apparatus 900 in communication with the RTU motherboard (for example, for power and data) and the central SCADA network, according to some implementations of the present disclosure. The custom hard disk apparatus 900 includes a memory 902, a processor 904 (for example, a central processing unit (CPU)), a relay 906, a UPS 908, a homing beacon 910, and a GPS receiver 912 coupled to an instrumented security function (ISF) chip 914 executable by an onboard chip. The custom hard disk apparatus 900 further includes a power source (for example, batteries 916), a charger 918 for receiving RTU power 920 (to charge the batteries 916), and an internal power feed circuit 922. The custom hard disk apparatus 900 includes an external serial advanced technology attachment (eSATA) port 924 that can be attached to the RTU motherboard. Input 926 from the NAC (received through the SCADA network) can include a positive authentication 928 and a negative authentication 930.

Figure 10:
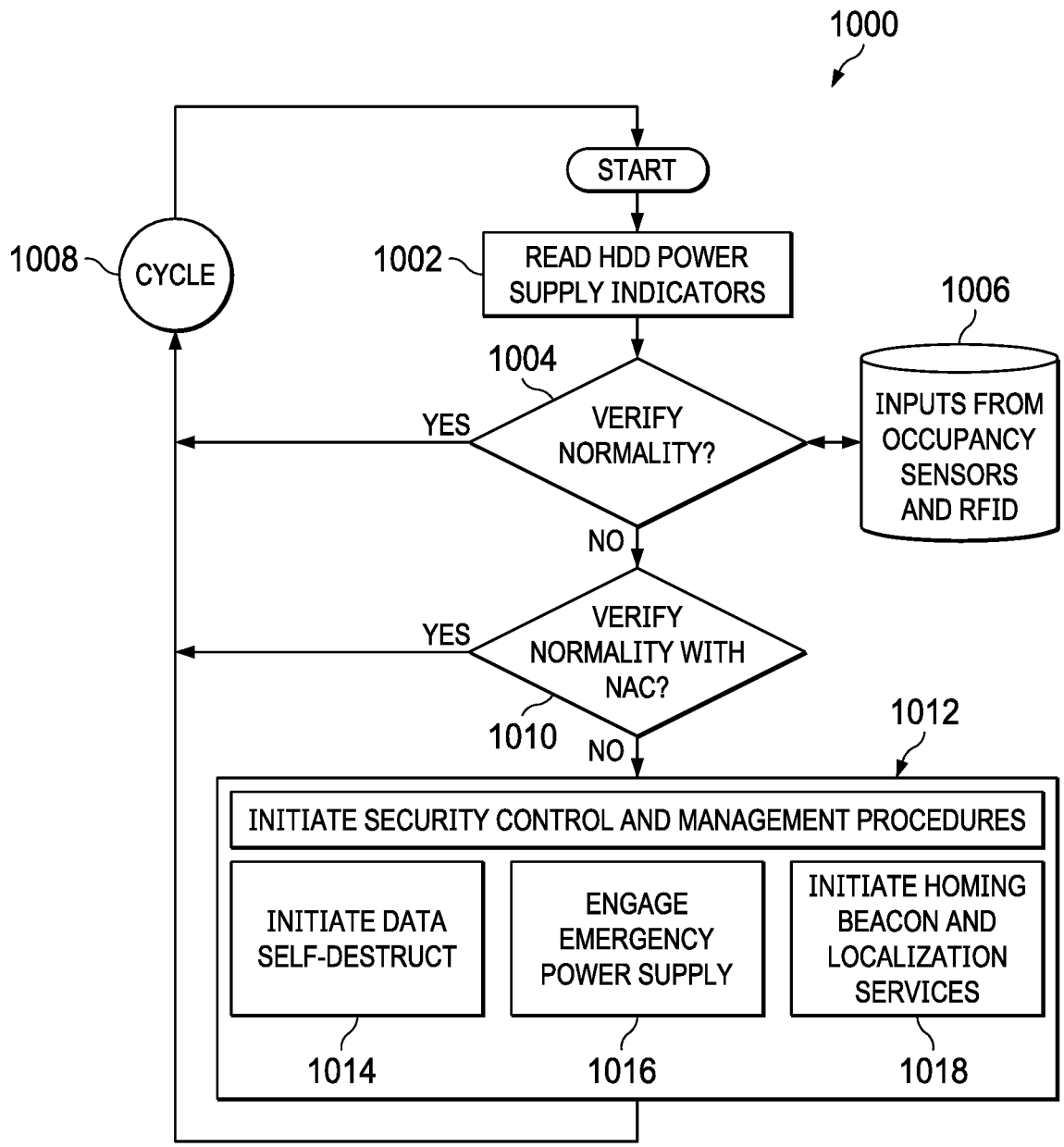
FIG. 10 is a flow diagram showing an example of a logic flow for an instrumented security function (ISF) chip, according to some implementations of the present disclosure.

FIG. 10 is a flow diagram showing an example of a logic flow 1000 for the ISF chip, according to some implementations of the present disclosure. In some implementations, the ISF chip (or software that implements ISF chip functionality) can be part of the RTU or can be added to the NAC apparatus.

At 1002, hard disk drive (HDD) power supply indicators are read. At 1004, normality verification occurs using inputs from occupancy sensors and an RFID 1006. At 1008, cycling continues in the logic flow 1000, where the cycling continues until normality verification indicates a non-normal state. At 1010, when normality verification indicates a non-normal state, normality is then verified with the NAC. If normality is detected by the NAC, then cycling (508) continues in the logic flow 1000.

If normality verification at 1010 indicates a non-normal state, then security control and management procedures are initiated at 1012. At 1014, a data self-destruct is initiated, for example, to erase RTU data. At 1016, the emergency power supply is engaged, for example, if the ISF chip 914 determines that the primary power supply has been interrupted (or is intermittent). At 1018, HBL services are activated to activate the homing beacon (for example, the homing beacon 126 or the homing beacon 910).

Figure 11:
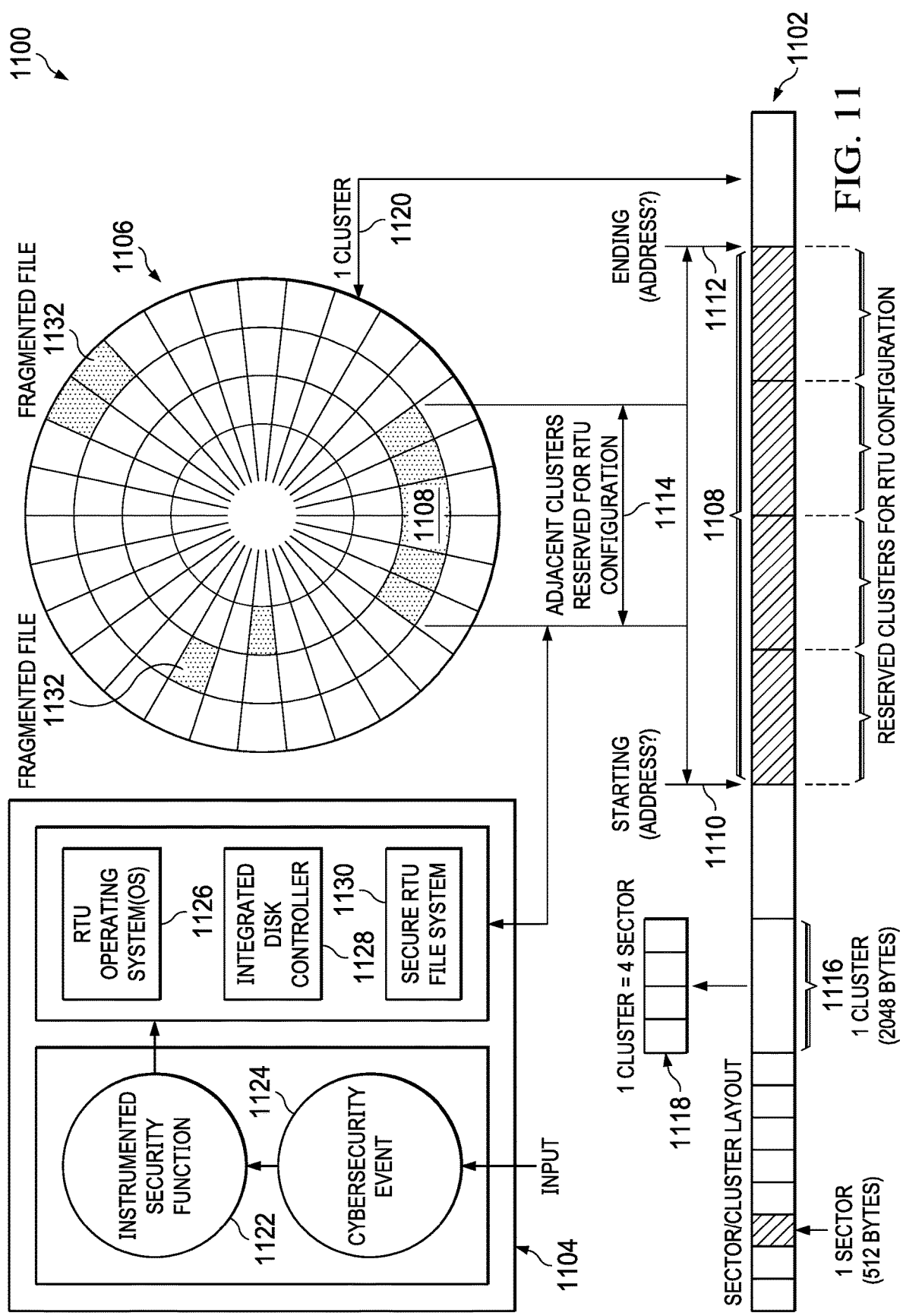
FIG. 11 is a block diagram depicting examples of disk cluster assignments and file allocation table features for facilitating a rapid erase of information in case of an RTU or disk compromise, according to some implementations of the present disclosure.

FIG. 11 is a block diagram depicting examples of a system 1100 including disk cluster assignments 1102 and file allocation table features 1104 for facilitating a rapid erase of information in case of an RTU or disk compromise, according to some implementations of the present disclosure. The disk cluster assignments 1102 can define locations on a disk 1106 for particular files. For example, adjacent clusters 1108 having a starting address 1110 and an ending address 1112 can be reserved for RTU configuration files 1114.

Each cluster can have a size 1116 (for example, 2048 bytes) and can be equivalent to a number of sectors 1118 (for example, four). Each sector is represented by a single region 1120 depicted on the disk 1106.

The File Allocation Table (FAT) features 1104 include an instrumented security function 1122 (for example, corresponding to the ISF chip 914) for tracking cybersecurity events 1124. The instrumented security function 1122 can trigger components of the file allocation table features 1104, including an RTU operating system (OS) 1126, an integrated disk controller 1128, and a secure RTU file system 1130. Components of the file allocation table features 1104 can be used to erase the disk 1106. Erasing the disk 1106 can occur sector-by-sector, for example, giving priority to sectors that should be erased first (for example, sectors containing the RTU configuration files 1114). Erasing can occur faster because of the use of adjacent sectors instead of allowing particular files to be stored as a fragmented file 1132.

The system 1100 can include security configuration software that performs various functions including, for example, resolving logic of securing SCADA network port access. For example, in case of a failed RFID identification or upon a motion detection in the vicinity of the RTU, a countdown can be initiated for entry of a security authorization PIN before a command or notification is sent to the SCADA systems. The command can include, for example, a request to initiate video recording or a network management command to shut down the network port upon timeout expiration.

Figure 12:
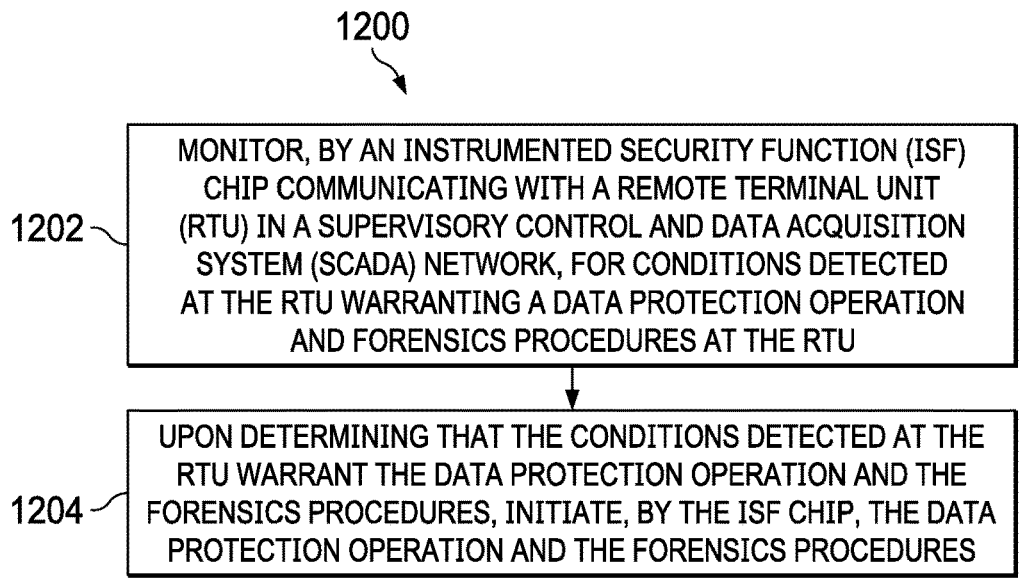
FIG. 12 is a flowchart of an example method for initiating data protection operations and forensics procedures, when conditions monitored at the RTU are detected that warrant the data protection operation and the forensics procedures, according to some implementations of the present disclosure.

FIG. 12 is a flowchart of an example method 1200 for initiating data protection operations and forensics procedures, when conditions monitored at the RTU are detected that warrant the data protection operation and the forensics procedures, according to some implementations of the present disclosure. For clarity of presentation, the description that follows generally describes method 1200 in the context of the other figures in this description. However, it will be understood that method 1200 can be performed, for example, by any suitable system, environment, software, and hardware, or a combination of systems, environments, software, and hardware, as appropriate. In some implementations, various steps of method 1200 can be run in parallel, in combination, in loops, or in any order.

At 1202, monitoring is performed for conditions detected at an RTU that warrant a data protection operation and forensics procedures at the RTU. The monitoring can be performed, for example, by the ISF chip 914 communicating with the remote RTU 406 in the SCADA network 404.

In some implementations, monitoring for the conditions can include operations of the logic flow 1000. For example, normality of the RTU can be verified by analyzing inputs received from occupancy sensors and radio frequency identification (RFID) instruments of the RTU. Inputs can be verified as they are received from a network access controller (NAC) in the SCADA network. From 1202, method 1200 proceeds to 1204.

At 1204, upon determining that the conditions detected at the RTU warrant the data protection operation and forensics procedures, the data protection operation and the forensics procedures are initiated by the ISF chip. A data self-destruct of the RTU data can be initiated (for example, by the ISF chip 914). An emergency power supply can be engaged, such as a non-primary, backup power source of the RTU. A homing beacon and localization services can be activated, for example, that can be used by the forensics on-demand tracker 424.

In some implementations, initiating a data self-destruct of the RTU data by the ISF chip includes using a rapid erase file system (REFS) to quickly erase different types of information in a prioritized order, where each different type of information is ranked by a priority corresponding to criticality level of the different type of information. For example, the ISF chip 914 can initiate a process to erase clusters of the disk 1106 in an order that is based on priorities assigned to different clusters.

In some implementations, method 1200 can further include storing critical RTU data, including RTU configuration data, in adjacent clusters on a disk to decrease erasing times. For example, the RTU configuration files 1114 can be stored in adjacent clusters near the center of the disk 1106.

In some implementations, method 1200 further includes operations used to recover replicated RTU data. For example, RTU data of the RTU can be periodically replicated to preserve the RTU data for use in a recovery of the RTU data. At a time after completion the data protection operation and the forensics procedures, a presence of normal conditions at the RTU can be determined. Upon determining the presence of normal conditions at the RTU, the RTU data can be recovered.

In some implementations, periodically replicating the RTU data can be done in various ways. For example, the RTU data can be replicated to an encrypted storage device in the RTU. In another example, the RTU data can be replicated to an encrypted storage device in a different RTU. In another example, the RTU can be replicated data to an array of encrypted data storage allocated on the SCADA network.

Figure 13:
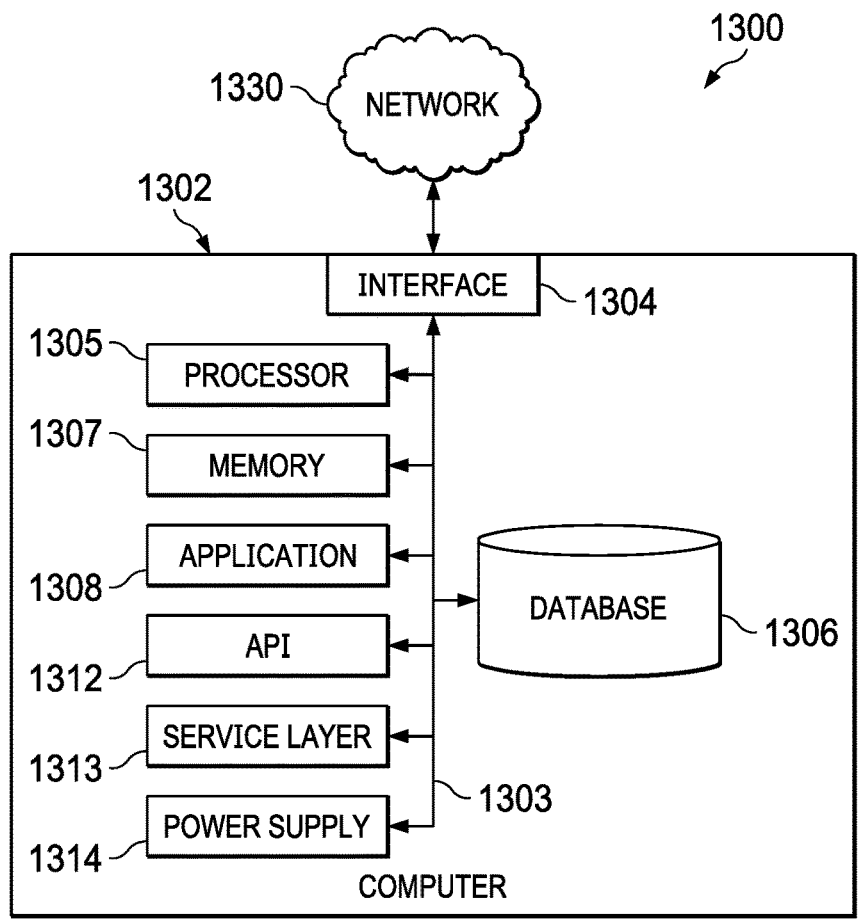
FIG. 13 is a block diagram illustrating an example computer system used to provide computational functionalities associated with described algorithms, methods, functions, processes, flows, and procedures as described in the present disclosure, according to some implementations of the present disclosure.

FIG. 13 is a block diagram of an example computer system 1300 used to provide computational functionalities associated with described algorithms, methods, functions, processes, flows, and procedures described in the present disclosure, according to some implementations of the present disclosure. The illustrated computer 1302 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 1302 can include input devices such as keypads, keyboards, and touch screens that can accept user information. Also, the computer 1302 can include output devices that can convey information associated with the operation of the computer 1302. The information can include digital data, visual data, audio information, or a combination of information. The information can be presented in a graphical user interface (UI) (or GUI).

The computer 1302 can serve in a role as a client, a network component, a server, a database, a persistency, or components of a computer system for performing the subject matter described in the present disclosure. The illustrated computer 1302 is communicably coupled with a network 1330. In some implementations, one or more components of the computer 1302 can be configured to operate within different environments, including cloud-computing-based environments, local environments, global environments, and combinations of environments.

At a high level, the computer 1302 is an electronic computing device operable to receive, transmit, process, store, and manage data and information associated with the described subject matter. According to some implementations, the computer 1302 can also include, or be communicably coupled with, an application server, an email server, a web server, a caching server, a streaming data server, or a combination of servers.

The computer 1302 can receive requests over network 1330 from a client application (for example, executing on another computer 1302). The computer 1302 can respond to the received requests by processing the received requests using software applications. Requests can also be sent to the computer 1302 from internal users (for example, from a command console), external (or third) parties, automated applications, entities, individuals, systems, or computers.

Each of the components of the computer 1302 can communicate using a system bus 1303. In some implementations, any or all of the components of the computer 1302, including hardware or software components, can interface with each other or the interface 1304 (or a combination of both), over the system bus 1303. Interfaces can use an application programming interface (API) 1312, a service layer 1313, or a combination of the API 1312 and service layer 1313. The API 1312 can include specifications for routines, data structures, and object classes. The API 1312 can be either computer-language independent or dependent. The API 1312 can refer to a complete interface, a single function, or a set of APIs.

The service layer 1313 can provide software services to the computer 1302 and other components (whether illustrated or not) that are communicably coupled to the computer 1302. The functionality of the computer 1302 can be accessible for all service consumers using this service layer. Software services, such as those provided by the service layer 1313, can provide reusable, defined functionalities through a defined interface. For example, the interface can be software written in JAVA, C++, extensible markup language (XML), or any other suitable computer coding language. While illustrated as an integrated component of the computer 1302, in alternative implementations, the API 1312 or the service layer 1313 can be stand-alone components in relation to other components of the computer 1302 and other components communicably coupled to the computer 1302. Moreover, any or all parts of the API 1312 or the service layer 1313 can be implemented as child or sub-modules of another software module, enterprise application, or hardware module without departing from the scope of the present disclosure.

The computer 1302 includes an interface 1304. Although illustrated as a single interface 1304 in FIG. 13, two or more interfaces 1304 can be used according to particular needs, desires, or particular implementations of the computer 1302 and the described functionality. The interface 1304 can be used by the computer 1302 for communicating with other systems that are connected to the network 1330 (whether illustrated or not) in a distributed environment. Generally, the interface 1304 can include, or be implemented using, logic encoded in software or hardware (or a combination of software and hardware) operable to communicate with the network 1330. More specifically, the interface 1304 can include software supporting one or more communication protocols associated with communications. As such, the network 1330 or the interface's hardware can be operable to communicate physical signals within and outside of the illustrated computer 1302.

The computer 1302 includes a processor 1305. Although illustrated as a single processor 1305 in FIG. 13, two or more processors 1305 can be used according to particular needs, desires, or particular implementations of the computer 1302 and the described functionality. Generally, the processor 1305 can execute instructions and can manipulate data to perform the operations of the computer 1302, including operations using algorithms, methods, functions, processes, flows, and procedures as described in the present disclosure.

The computer 1302 also includes a database 1306 that can hold data for the computer 1302 and other components connected to the network 1330 (whether illustrated or not). For example, database 1306 can be an in-memory, conventional, or a database storing data consistent with the present disclosure. In some implementations, database 1306 can be a combination of two or more different database types (for example, hybrid in-memory and conventional databases) according to particular needs, desires, or particular implementations of the computer 1302 and the described functionality. Although illustrated as a single database 1306 in FIG. 13, two or more databases (of the same, different, or combination of types) can be used according to particular needs, desires, or particular implementations of the computer 1302 and the described functionality. While database 1306 is illustrated as an internal component of the computer 1302, in alternative implementations, database 1306 can be external to the computer 1302.

The computer 1302 also includes a memory 1307 that can hold data for the computer 1302 or a combination of components connected to the network 1330 (whether illustrated or not). Memory 1307 can store any data consistent with the present disclosure. In some implementations, memory 1307 can be a combination of two or more different types of memory (for example, a combination of semiconductor and magnetic storage) according to particular needs, desires, or particular implementations of the computer 1302 and the described functionality. Although illustrated as a single memory 1307 in FIG. 13, two or more memories 1307 (of the same, different, or combination of types) can be used according to particular needs, desires, or particular implementations of the computer 1302 and the described functionality. While memory 1307 is illustrated as an internal component of the computer 1302, in alternative implementations, memory 1307 can be external to the computer 1302.

The application 1308 can be an algorithmic software engine providing functionality according to particular needs, desires, or particular implementations of the computer 1302 and the described functionality. For example, application 1308 can serve as one or more components, modules, or applications. Further, although illustrated as a single application 1308, the application 1308 can be implemented as multiple applications 1308 on the computer 1302. In addition, although illustrated as internal to the computer 1302, in alternative implementations, the application 1308 can be external to the computer 1302.

The computer 1302 can also include a power supply 1314. The power supply 1314 can include a rechargeable or non-rechargeable battery that can be configured to be either user- or non-user-replaceable. In some implementations, the power supply 1314 can include power-conversion and management circuits, including recharging, standby, and power management functionalities. In some implementations, the power-supply 1314 can include a power plug to allow the computer 1302 to be plugged into a wall socket or a power source to, for example, power the computer 1302 or recharge a rechargeable battery.

There can be any number of computers 1302 associated with, or external to, a computer system containing computer 1302, with each computer 1302 communicating over network 1330. Further, the terms "client," "user," and other appropriate terminology can be used interchangeably, as appropriate, without departing from the scope of the present disclosure. Moreover, the present disclosure contemplates that many users can use one computer 1302 and one user can use multiple computers 1302.

Described implementations of the subject matter can include one or more features, alone or in combination.

For example, in a first implementation, a computer-implemented method for protecting data for a remote terminal unit (RTU) includes the following. Monitoring is performed for conditions detected at an RTU that warrant a data protection operation and forensics procedures at the RTU. The monitoring is performed by an instrumented security function (ISF) chip communicating with the RTU in a supervisory control and data acquisition system (SCADA) network. Upon determining that the conditions detected at the RTU warrant the data protection operation, the data protection operation and the forensics procedures are initiated by the ISF chip.

The foregoing and other described implementations can each, optionally, include one or more of the following features:

A first feature, combinable with any of the following features, the method further includes: periodically replicating RTU data of the RTU to preserve the RTU data for use in a recovery of the RTU data; determining, at a time after completion the data protection operation and the forensics procedures, a presence of normal conditions at the RTU; and upon determining the presence of normal conditions at the RTU, recovering the RTU data.

A second feature, combinable with any of the previous or following features, where periodically replicating the RTU data includes one or more of: replicating the RTU data to an encrypted storage device in the RTU; replicating the RTU data to an encrypted storage device in a different RTU; and replicating the RTU data to an array of encrypted data storage allocated on the SCADA network.

A third feature, combinable with any of the previous or following features, where initiating the data protection operation and the forensics procedures includes: initiating a data self-destruct of the RTU data by the ISF chip; engaging an emergency power supply; and activating a homing beacon and localization services.

A fourth feature, combinable with any of the previous or following features, where initiating a data self-destruct of the RTU data by the ISF chip includes using a rapid erase file system (REFS) to quickly erase different types of information in a prioritized order, where each different type of information is ranked by a priority corresponding to criticality level of the different type of information.

A fifth feature, combinable with any of the previous or following features, the method further including storing critical RTU data, including RTU configuration data, in adjacent clusters on a disk to decrease erasing times.

A sixth feature, combinable with any of the previous or following features, where monitoring for the conditions detected at the RTU warranting the data protection operation and the forensics procedures at the RTU includes: verifying normality of the RTU by analyzing inputs received from occupancy sensors and radio frequency identification (RFID) instruments of the RTU; and verifying inputs received from a network access controller (NAC) in the SCADA network.

In a second implementation, a non-transitory, computer-readable medium storing one or more instructions executable by a computer system to perform operations including the following. Monitoring is performed for conditions detected at an RTU that warrant a data protection operation and forensics procedures at the RTU. The monitoring is performed by an instrumented security function (ISF) chip communicating with the RTU in a supervisory control and data acquisition system (SCADA) network. Upon determining that the conditions detected at the RTU warrant the data protection operation and the forensics procedures, the data protection operation and the forensics procedures are initiated by the ISF chip.

The foregoing and other described implementations can each, optionally, include one or more of the following features:

A first feature, combinable with any of the following features, the operations further including: periodically replicating RTU data of the RTU to preserve the RTU data for use in a recovery of the RTU data; determining, at a time after completion the data protection operation and the forensics procedures, a presence of normal conditions at the RTU; and upon determining the presence of normal conditions at the RTU, recovering the RTU data.

A second feature, combinable with any of the previous or following features, where periodically replicating the RTU data includes one or more of: replicating the RTU data to an encrypted storage device in the RTU; replicating the RTU data to an encrypted storage device in a different RTU; and replicating the RTU data to an array of encrypted data storage allocated on the SCADA network.

A third feature, combinable with any of the previous or following features, where initiating the data protection operation and the forensics procedures includes: initiating a data self-destruct of the RTU data by the ISF chip; engaging an emergency power supply; and activating a homing beacon and localization services.

A fourth feature, combinable with any of the previous or following features, where initiating a data self-destruct of the RTU data by the ISF chip includes using a rapid erase file system (REFS) to quickly erase different types of information in a prioritized order, where each different type of information is ranked by a priority corresponding to criticality level of the different type of information.

A fifth feature, combinable with any of the previous or following features, the operations further including storing critical RTU data, including RTU configuration data, in adjacent clusters on a disk to decrease erasing times.

A sixth feature, combinable with any of the previous or following features, where monitoring for the conditions detected at the RTU warranting the data protection operation and forensics procedures at the RTU includes: verifying normality of the RTU by analyzing inputs received from occupancy sensors and radio frequency identification (RFID) instruments of the RTU; and verifying inputs received from a network access controller (NAC) in the SCADA network.

In a third implementation, a computer-implemented system, including one or more processors and a non-transitory computer-readable storage medium coupled to the one or more processors and storing programming instructions for execution by the one or more processors, the programming instructions instructing the one or more processors to perform operations including: monitoring, by an instrumented security function (ISF) chip communicating with a remote terminal unit (RTU) in a supervisory control and data acquisition system (SCADA) network, for conditions detected at the RTU warranting a data protection operation and forensics procedures at the RTU; and upon determining that the conditions detected at the RTU warrant the data protection operation and the forensics procedures, initiating, by the ISF chip, the data protection operation and the forensics procedures.

The foregoing and other described implementations can each, optionally, include one or more of the following features:

A first feature, combinable with any of the following features, the operations further including: periodically replicating RTU data of the RTU to preserve the RTU data for use in a recovery of the RTU data; determining, at a time after completion the data protection operation and the forensics procedures, a presence of normal conditions at the RTU; and upon determining the presence of normal conditions at the RTU, recovering the RTU data.

A second feature, combinable with any of the previous or following features, where periodically replicating the RTU data includes one or more of: replicating the RTU data to an encrypted storage device in the RTU; replicating the RTU data to an encrypted storage device in a different RTU; and replicating the RTU data to an array of encrypted data storage allocated on the SCADA network.

A third feature, combinable with any of the previous or following features, where initiating the data protection operation and the forensics procedures includes: initiating a data self-destruct of the RTU data by the ISF chip; engaging an emergency power supply; and activating a homing beacon and localization services.

A fourth feature, combinable with any of the previous or following features, where initiating a data self-destruct of the RTU data by the ISF chip includes using a rapid erase file system (REFS) to quickly erase different types of information in a prioritized order, where each different type of information is ranked by a priority corresponding to criticality level of the different type of information.

A fifth feature, combinable with any of the previous or following features, the operations further including storing critical RTU data, including RTU configuration data, in adjacent clusters on a disk to decrease erasing times.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
    monitoring, by an instrumented security function (ISF) chip communicating with a remote terminal unit (RTU) in a supervisory control and data acquisition system (SCADA) network, for conditions detected at the RTU warranting a data protection operation and forensics procedures at the RTU, wherein the ISF chip is a computer chip installed on a custom hard disk apparatus, and wherein the computer chip provides local services for the RTU and secure access in the SCADA network; and
    upon determining that the conditions detected at the RTU warrant the data protection operation and the forensics procedures, initiating, by the ISF chip, the data protection operation and the forensics procedures, including:
        initiating a data self-destruct of the RTU data by the ISF chip;
        engaging an emergency power supply; and
        activating a homing beacon and localization services.

2. The computer-implemented method of claim 1, further comprising:
    periodically replicating RTU data of the RTU to preserve the RTU data for use in a recovery of the RTU data;
    determining, at a time after completion the data protection operation and the forensics procedures, a presence of normal conditions at the RTU; and
    upon determining the presence of normal conditions at the RTU, recovering the RTU data.

3. The computer-implemented method of claim 2, wherein periodically replicating the RTU data includes one or more of:
    replicating the RTU data to an encrypted storage device in the RTU;
    replicating the RTU data to an encrypted storage device in a different RTU; and
    replicating the RTU data to an array of encrypted data storage allocated on the SCADA network.

4. The computer-implemented method of claim 1, wherein initiating a data self-destruct of the RTU data by the ISF chip includes using a rapid erase file system (REFS) to quickly erase different types of information in a prioritized order, wherein each different type of information is ranked by a priority corresponding to criticality level of the different type of information.

5. The computer-implemented method of claim 4, further comprising storing critical RTU data, including RTU configuration data, in adjacent clusters on the custom hard disk apparatus to decrease erasing times.

6. The computer-implemented method of claim 1, wherein monitoring for the conditions detected at the RTU warranting the data protection operation and the forensics procedures at the RTU includes:
    verifying normality of the RTU by analyzing inputs received from occupancy sensors and radio frequency identification (RFID) instruments of the RTU; and
    verifying inputs received from a network access controller (NAC) in the SCADA network.

7. A non-transitory, computer-readable medium storing one or more instructions executable by a computer system to perform operations comprising:
    monitoring, by an instrumented security function (ISF) chip communicating with a remote terminal unit (RTU) in a supervisory control and data acquisition system (SCADA) network, for conditions detected at the RTU warranting a data protection operation and forensics procedures at the RTU, wherein the ISF chip is a computer chip installed on a custom hard disk apparatus, and wherein the computer chip provides local services for the RTU and secure access in the SCADA network; and upon determining that the conditions detected at the RTU warrant the data protection operation and the forensics procedures, initiating, by the ISF chip, the data protection operation and the forensics procedures, including:
  initiating a data self-destruct of the RTU data by the ISF chip;
  engaging an emergency power supply; and
  activating a homing beacon and localization services.

8. The non-transitory, computer-readable medium of claim 7, the operations further comprising:
  periodically replicating RTU data of the RTU to preserve the RTU data for use in a recovery of the RTU data;
  determining, at a time after completion the data protection operation and the forensics procedures, a presence of normal conditions at the RTU; and
  upon determining the presence of normal conditions at the RTU, recovering the RTU data.

9. The non-transitory, computer-readable medium of claim 8, wherein periodically replicating the RTU data includes one or more of:
  replicating the RTU data to an encrypted storage device in the RTU;
  replicating the RTU data to an encrypted storage device in a different RTU; and
  replicating the RTU data to an array of encrypted data storage allocated on the SCADA network.

10. The non-transitory, computer-readable medium of claim 7, wherein initiating a data self-destruct of the RTU data by the ISF chip includes using a rapid erase file system (REFS) to quickly erase different types of information in a prioritized order, wherein each different type of information is ranked by a priority corresponding to criticality level of the different type of information.

11. The non-transitory, computer-readable medium of claim 10, the operations further comprising storing critical RTU data, including RTU configuration data, in adjacent clusters on the custom hard disk apparatus to decrease erasing times.

12. The non-transitory, computer-readable medium of claim 7, wherein monitoring for the conditions detected at the RTU warranting the data protection operation and the forensics procedures at the RTU includes:
  verifying normality of the RTU by analyzing inputs received from occupancy sensors and radio frequency identification (RFID) instruments of the RTU; and
  verifying inputs received from a network access controller (NAC) in the SCADA network.

13. A computer-implemented system, comprising:
one or more processors; and
a non-transitory computer-readable storage medium coupled to the one or more processors and storing programming instructions for execution by the one or more processors, the programming instructions instructing the one or more processors to perform operations comprising:
  monitoring, by an instrumented security function (ISF) chip communicating with a remote terminal unit (RTU) in a supervisory control and data acquisition system (SCADA) network, for conditions detected at the RTU warranting a data protection operation and forensics procedures at the RTU, wherein the ISF chip is a computer chip installed on a custom hard disk apparatus, and wherein the computer chip provides local services for the RTU and secure access in the SCADA network; and
  upon determining that the conditions detected at the RTU warrant the data protection operation and the forensics procedures, initiating, by the ISF chip, the data protection operation and the forensics procedures, including:
    initiating a data self-destruct of the RTU data by the ISF chip;
    engaging an emergency power supply; and
    activating a homing beacon and localization services.

14. The computer-implemented system of claim 13, the operations further comprising:
  periodically replicating RTU data of the RTU to preserve the RTU data for use in a recovery of the RTU data;
  determining, at a time after completion the data protection operation and the forensics procedures, a presence of normal conditions at the RTU; and
  upon determining the presence of normal conditions at the RTU, recovering the RTU data.

15. The computer-implemented system of claim 14, wherein periodically replicating the RTU data includes one or more of:
  replicating the RTU data to an encrypted storage device in the RTU;
  replicating the RTU data to an encrypted storage device in a different RTU; and
  replicating the RTU data to an array of encrypted data storage allocated on the SCADA network.

16. The computer-implemented system of claim 13, wherein initiating a data self-destruct of the RTU data by the ISF chip includes using a rapid erase file system (REFS) to quickly erase different types of information in a prioritized order, wherein each different type of information is ranked by a priority corresponding to criticality level of the different type of information.

17. The computer-implemented system of claim 16, the operations further comprising storing critical RTU data, including RTU configuration data, in adjacent clusters on the custom hard disk apparatus to decrease erasing times.

* * * * *